Patented Oct. 5, 1937

2,095,113

UNITED STATES PATENT OFFICE 2,095,113

VULCANIZABLE COMPOSITION

Jacob Emerson Wolfe, Akron, Ohio, assignor to The B. F. Goodrich Company, New York, N. Y., a corporation of New York No Drawing. Application January 20, 1932, Serial No. 587,763

7 Claims. (Cl. 106—23)

This invention relates to the art of preparing vulcanizable plastics, and particularly to the preparation of compositions which are extremely resistant to deteriorating influences and to corrosion.

I have found that when rubber is mixed with polymerized vinyl chloride and a non-volatile mutual solvent for the two first-named constituents, and then vulcanized, that the resultant composition is highly resistant to the action of corrosive chemicals such as acids, alkalies, and even powerful oxidizing agents, and is completely insoluble in all ordinary solvents.

For example, 64 parts by weight of rubber are mixed on the usual roll mills with 0.1 part organic accelerator such as poly butylidene aniline, 2 parts calcined magnesia, 16 parts sulphur, and 5 parts of a softener such as a fatty oil. 20 parts of powdered polymerized vinyl chloride are separately mixed with 15 parts of o-nitro diphenylether and then incorporated into the rubber composition. This composition may be vulcanized at a temperature corresponding to 75 lbs. steam pressure (165° C.) for from 1 to 5 hours. After five hours the tensile strength of the composition is approximately 4000 pounds per square inch with an ultimate elongation of 60%. The composition is not only strong and flexible, but highly resistant to the action of solvents and corrosive chemicals in general.

Another softer and more flexible composition is similarly prepared from 100 parts by weight of rubber, 40 parts of sulphur, 140 parts of powdered polymerized vinyl chloride and 105 parts of o-nitro diphenylether. After vulcanization this composition exhibits the same extraordinary resistance to chemicals as that described above.

In these compositions the chief function of the sulphur apparently is to vulcanize the rubber, saturating its double bonds, but it may possibly react to some extent with the other components. The o-nitro diphenylether is a plasticizer and mutual solvent for the rubber and the polymerized vinyl chloride, promoting a homogeneous admixture of the constituents and increasing the flexibility of the product. The polymerized vinyl chloride apparently serves to increase the corrosion resistance of the product. However, the advantageous properties of this composition are not secured unless at least the three constituents, rubber, polymerized vinyl chloride, and plasticizer or non-volatile mutual solvent, are present, and preferably there is also enough sulphur to vulcanize the rubber completely.

The polymerized vinyl chloride is preferably a product which is insoluble in all ordinary solvents at room temperature, but soluble in many organic solvents, including most aromatic liquids, at elevated temperatures. Such a product may be prepared by exposing a concentrated methanol solution of vinyl chloride to sunlight or to ultraviolet light until a considerable volume of amorphous precipitate is formed. This precipitate is polymerized vinyl chloride and is separated from the solution by filtration, in the form of a white or light-colored, amorphous powder.

Other polymerized vinyl halides such as the bromide may be substituted for the polymerized vinyl chloride if desired.

The plasticizer may be any non-volatile organic liquid which is a mutual solvent for polymerized vinyl chloride and rubber. Aromatic compounds such as the o-nitro diphenylether used in the compositions described above, or other liquid, non-volatile nitro compounds, aromatic halides, amines, etc. may be employed, or even a mixture of several such substances.

It is to be understood that the composition herein described is subject to numerous modifications without exceeding the scope of the invention, and that it is accordingly to be limited only as may be required by the prior art and as indicated in the appended claims.

I claim:

1. A vulcanized composition comprising before vulcanization rubber, sulphur, polymerized vinyl chloride, and a non-volatile mutual solvent for the rubber and the polymerized vinyl chloride.

2. A vulcanized composition comprising before vulcanization rubber, sufficient sulphur substantially to saturate the rubber, polymerized vinyl chloride, and a non-volatile mutual solvent for the rubber and the polymerized vinyl chloride.

3. A vulcanized composition comprising before vulcanization rubber, sufficient sulphur substantially to saturate the rubber, polymerized vinyl chloride in a form insoluble at ordinary temperatures but soluble in aromatic solvents at elevated temperatures, and a non-volatile mutual solvent for the rubber and the polymerized vinyl chloride.

4. A vulcanized composition comprising before vulcanization a major proportion of rubber, sufficient sulphur substantially to saturate the rubber, and minor proportions of polymerized vinyl chloride in a form insoluble at ordinary temperatures but soluble in aromatic solvents at elevated temperatures, and of a non-volatile mutual solvent for the rubber and the polymerized vinyl chloride.

5. A composition as in claim 4, in which the mutual solvent is o-nitro diphenylether.

6. The method of preparing a chemically resistant composition which comprises heating a mixture of rubber, sulphur, polymerized vinyl chloride, and a non-volatile mutual solvent for the rubber and the polymerized vinyl chloride.

7. The method of preparing a chemically resistant composition which comprises heating a mixture of a major proportion of rubber, sufficient sulphur substantially to saturate the rubber, and minor proportions of polymerized vinyl chloride in a form insoluble at ordinary temperatures but soluble in aromatic solvents at elevated temperatures, and of a non-volatile mutual solvent for the rubber and the polymerized vinyl chloride.

JACOB EMERSON WOLFE.